United States Patent [19]

Kuwajima

[11] Patent Number: 5,166,843
[45] Date of Patent: Nov. 24, 1992

[54] COMPACT HELICAL SCAN TAPE RECORDING AND/OR REPRODUCING APPARATUS

[75] Inventor: Hideki Kuwajima, Kyoto, Japan

[73] Assignee: Matsushita Electric Industrial Co., Ltd., Osaka, Japan

[21] Appl. No.: 195,673

[22] Filed: May 13, 1988

[30] Foreign Application Priority Data

| May 13, 1987 | [JP] | Japan | 62-117781 |
| May 13, 1987 | [JP] | Japan | 62-117782 |
| Jun. 25, 1987 | [JP] | Japan | 62-158188 |
| Jun. 25, 1987 | [JP] | Japan | 62-158189 |
| Jun. 26, 1987 | [JP] | Japan | 62-160031 |
| Jun. 29, 1987 | [JP] | Japan | 62-161735 |

[51] Int. Cl.⁵ .................................... G11B 15/61
[52] U.S. Cl. .................................... 360/85; 360/95
[58] Field of Search .................... 360/85, 95, 96.6

[56] References Cited

U.S. PATENT DOCUMENTS

| 4,122,506 | 10/1978 | Kubo et al. | 360/95 |
| 4,685,008 | 8/1987 | Ohyama | 360/85 |
| 4,688,120 | 8/1987 | Muller | 360/95 |
| 4,757,397 | 7/1988 | Zaitsu et al. | 360/95 |

FOREIGN PATENT DOCUMENTS

| 0162497 | 11/1985 | European Pat. Off. |
| 0227954 | 7/1987 | European Pat. Off. |
| 2406529 | 10/1974 | Fed. Rep. of Germany |
| 2552577 | 3/1985 | France |
| 56-44150 | 4/1981 | Japan |
| 57-186259 | 11/1982 | Japan |
| 59-104754 | 6/1984 | Japan |

Primary Examiner—David J. Severin
Attorney, Agent, or Firm—Lowe, Price, LeBlanc & Becker

[57] ABSTRACT

A magnetic tape recording and/or reproducing apparatus comprises a rotary cylinder having a plurality of magnetic transducer heads on a cylindrical surface thereof and rotatable about an axis tilted to the vertical for producing obliquely scanned paths on a magnetic tape. A first tape loading mechanism includes a first post movable along a first guide groove extending from a first inital position in which it engages with a tape from a cassette to a first terminal position adjacent the rotary cylinder. A second tape loading mechnism includes a second post movable along a second guide groove extending from a second initial position in which it engages with the tape to a second terminal position adjacent the rotary cylinder. The first and second tape loading mechanisms are driven to that the first and second posts move from the initial positions to the terminal positions to cause the tape to be pulled out of the cassette and form an arc of a predetermined angle on the cylindrical wall of the rotary cylinder. A locking mechanism is provided for locking the first and second posts in the first and second terminal positions such that the axes of the first and second posts are parallel with the axis of rotaion of the rotary cylinder.

19 Claims, 13 Drawing Sheets

COMPACT HELICAL SCAN TAPE RECORDING AND/OR REPRODUCING APPARATUS

BACKGROUND OF THE INVENTION

The present invention relates to a magnetic tape recording and/or reproducing apparatus, and more specifically to a compact helical scan video tape recording and/or reproducing apparatus.

Recent advances in electronics technologies have made possible the high density packaging of components in cassette video tape recorders with the accompanying advantageous reduction in size and weight. This is particularly beneficial to camera-mounted video tape recorders. According to a current standard for camera-mounted video tape recorders, the diameter of the rotary cylinder is ⅔ of the diameter of the cylinder employed in the standard non-portable video tape recorder and the tape is wound over an arc of 285 degrees on the circumference of the rotary cylinder much greater than the 190-degree winding of the non-portable standard. In addition, four magnetic transducer heads are mounted on the circumference of the cylinder with 90-degree angular spacing in contrast with the two-head cylinder of the non-portable standard.

It is a natural desire to provide a still compact video tape recorder by the use of the four-head, small diameter rotary cylinder with an 8-mm video recording format which is another standard for compact, camera-mounted video tape recorders.

SUMMARY OF THE INVENTION

It is a primary object of the present invention to provide a magnetic tape recording and/or reproducing apparatus which is compact and lightweight.

It is another object of this invention to provide a magnetic tape recording and/or reproducing apparatus in which the diameter of the rotary cylinder is ⅔ of the diameter of the cylinder employed in the standard, non-portable video tape recorder and in which the tape recording format is in accordance with the standard 8-mm video tape recording format.

It is a further object of this invention to provide a magnetic tape recording and/or reproducing apparatus having precision tape loading mechanisms.

Specifically, the magnetic tape recording and/or reproducing apparatus of this invention comprises a rotary cylinder having a plurality of magnetic transducer heads on a cylindrical surface thereof and rotatable about an axis tilted to the vertical for producing obliquely scanned paths on a magnetic tape. A first tape loading mechanism includes a first post movable along a first guide groove extending from a first initial position in which it engages with a tape from a cassette to a first terminal position adjacent the rotary cylinder. A second tape loading mechanism includes a second post movable along a second guide groove extending from a second initial position in which it engages with the tape to a second terminal position adjacent the rotary cylinder. The first and second tape loading mechanisms are driven so that the first and second posts move from the initial positions to the terminal positions to cause the tape to be pulled out of the cassette and form an arc of a predetermined angle on the cylindrical wall of the rotary cylinder. A locking mechanism is provided for locking the first and second posts in the first and second terminal positions such that the axes of the first and second posts are parallel with the axis of rotation of the rotary cylinder.

Because of the locked arrangement of the first and second posts, these posts can be precisely located in close proximity to the circumference of the rotary cylinder. Typically, the distance between each of the first and second posts and the circumference of the rotary cylinder can be determined with a tolerance of several hundreds of micrometers. Furthermore, because of the parallel arrangement of the posts with the center of rotation of the cylinder, the tape can be sharply turned about these posts as it approaches and leaves the rotary cylinder.

More specifically, the rotary cylinder is rotatable on a stationary cylinder having a center axis which is coaxial with the center of rotation of the rotary cylinder. The locking mechanism is arranged to coact with the stationary cylinder to lock the first and second posts in the first and second terminal positions, respectively. The locking mechanism includes a stationary positioning member, or pin rigidly located adjacent the stationary cylinder. Each of the first and second posts is in pressure contact between the stationary positioning member and a circumferential surface of the stationary cylinder. A second stationary positioning member is preferably located adjacent the rotary cylinder to precisely determine the vertical positions of the first and second posts. This is achieved by mounting the first and second posts on first and second supports and slidably contacting the supports with the second stationary positioning member when the first and second posts are proximate to the terminal positions. Alternatively, the stationary cylinder is formed with a contact surface for defining a vertical position, and each of the first and second supports is arranged to slidably contact with the contact surface of the stationary cylinder when the first and second posts are proximate to the terminal positions.

In a preferred embodiment of this invention, the first tape loading mechanism is mounted on a movable chassis and comprises a toothed stationary member and a first toothed wheel movable along a straight path and arranged to engage with the toothed stationary member to rotate about its center located on a first pivot. A second toothed wheel is in mesh with the first toothed wheel for rotation about its center located on a second pivot. A first loading arm is rotatable with the second toothed wheel at one end and carries the first support at the other end which is movable along a first loading guide between the first initial position and the first terminal position. A second loading arm is rotatable at one end thereof about the first pivot and mounts at the other end the second pivot. The second pivot is engaged with a groove to prevent rotation of the second loading arm when the first tape loading mechanism is moving over a predetermined length of travel and disengaged from contact with the groove at the end of the predetermined length to allow the second loading arm to rotate about the first pivot. This arrangement ensures a sufficient distance between the first post and the circumference of the rotary cylinder as the tape is being guided toward the cylinder while allowing it quickly access to it as it approaches the destination.

Preferably, the second tape loading mechanism comprises a loading ring concentrically rotatable about the center of rotation of the rotary cylinder and an arm pivoted at one end on the loading ring for pivotally mounting the second support at the other end which is slidably engaged with the second guide groove.

The magnetic tape recording and/or reproducing apparatus of this invention preferably includes a third, stationary post for making contact with the tape during recording and playback modes of the apparatus. The third post is inclined to the vertical so that the tape is twisted by contact therewith. A stationary member is provided having a contact surface parallel with the plane of the tape twisted by the third post. A tape guide arm is pivotally mounted at one end on the movable chassis and carries at the other end a tape guide roller for contacting with the tape in a position adjacent the third post. The tape guide arm has a cylindrical contact surface concentric with a pivot of the tape guide roller and a cam pin engaged with a guide groove to cause the cylindrical contact surface of the tape guide arm to contact with the contact surface of the stationary member under pressure. With this arrangement, the apparatus of the present invention is tolerant of manufacturing errors, or inevitable component variabilities.

In a further preferred embodiment, the magnetic tape recording and/or reproducing apparatus of the invention includes a rotatable cylindrical reel support for engaging with a reel of the cassette for unitary rotation therewith. A rotable tension arm having a tension post at one end thereof is provided for making a contact with the tape during recording and playback modes of the apparatus. A brake band, which is slip-frictionally looped around the circumference of the cylindrical reel support, is connected to the tension arm for counterbalancing a force which is exerted on it by the pressure contact between the tension post and the tape being transported. With this arrangement, the tension of the transported tape is automatically maintained at a constant value.

BRIEF DESCRIPTION OF THE DRAWINGS

The present invention will be described in further detail with reference to the accompanying drawings, in which.

DETAILED DESCRIPTION

Figure 1:
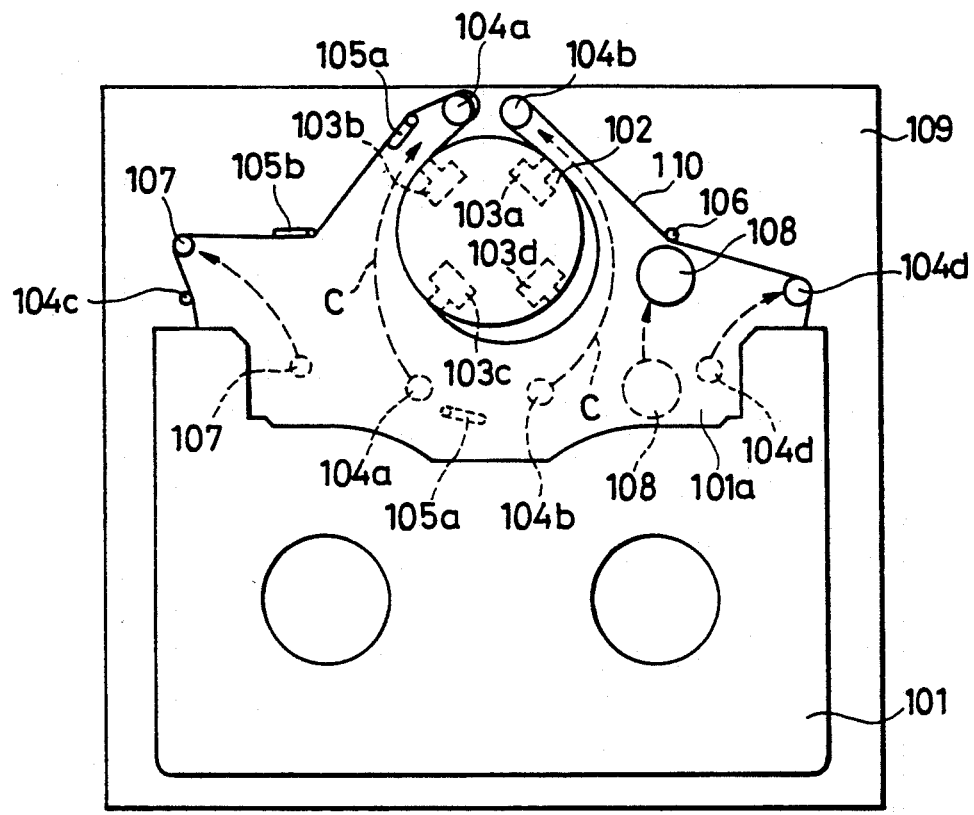
FIG. 1 is a plan view of a prior art video tape recorder.
Figure 2:
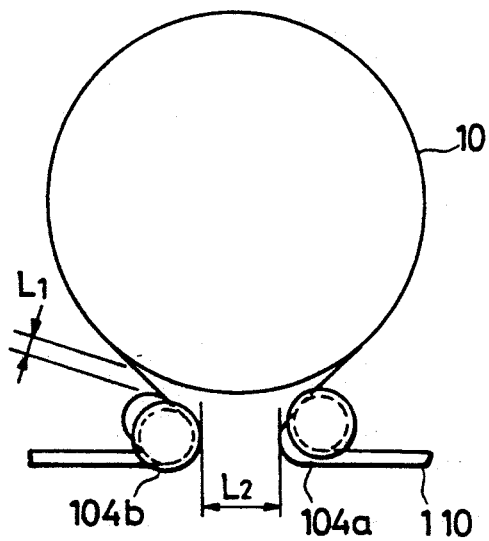
FIG. 2 is a plan view of a rotary cylinder of the prior art video tape recorder.
Figure 3:
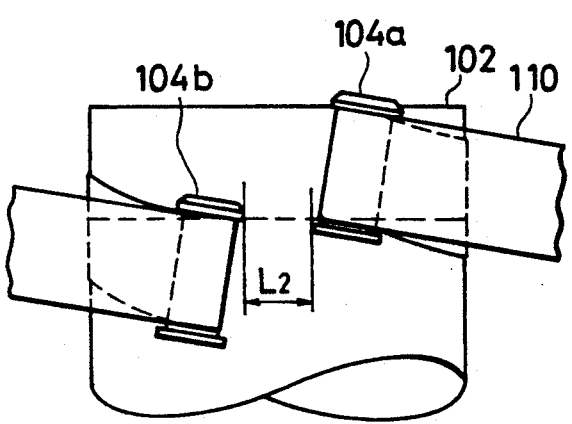
FIG. 3 is a side view of the prior art rotary cylinder.
Figure 4:
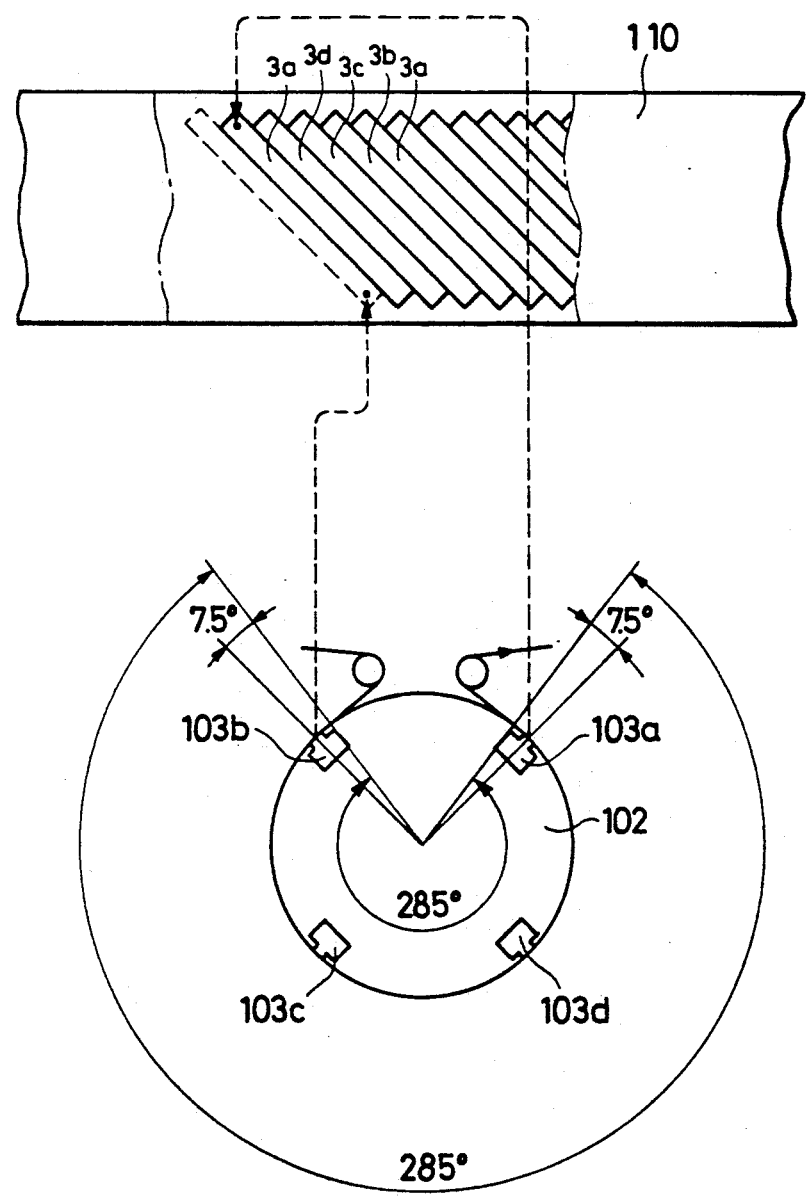
FIG. 4 is an explanatory view associated with the prior art video tape recorder.

Before going into the details of the present invention, it is appropriate to describe a prior art video tape recorder with reference to FIGS. 1 through 4. In FIG. 1, a cassette 101 having a tape-loaded reel is placed in a position proximate to the circumference of a rotary cylinder 102 which carries four magnetic transducer heads 103a through 103d at angular spacing of 90 degrees apart. Tape guide posts 104a and 104b are disposed within the area cleared by the cassette opening as indicated by broken lines when the cassette is inserted to the apparatus. A cassette sensing device, not shown, detects the insertion of a cassette and causes the tape guide posts 104a and 104b to move along the arcuate paths indicated by chain-dot-line arrows to such positions that the tape can be wound on the cylinder 102. This is a process known as tape loading. Inclined loading posts 105a and 105b are provided, the post 105 being fixedly secured to the same chassis as the tape guide post 104. The inclined post 105b is fixedly supported on a base plate 109. Numeral 106 indicates a capstan for transporting the magnetic tape 110 at a constant speed by pressing it against a pinch roller 108. FIG. 2 is a plan view of the rotary cylinder of the prior art video tape recording and reproducing apparatus and FIG. 3 is a front view of the rotary cylinder. FIG. 4 shows how the magnetic transducer heads 103a through 103d are switched from one head to another in sequence starting with head 103a, switching to head 103d and to head 103c and finally to head 103b. The tape is wound over an arc of 285 degrees which is 3/2 times greater than the standard 190 degrees. However, if such a four-head small-sized cylinder is to be used in an 8-mm video tape recorder in which the tape is wound with an angle of 221 degrees and a PCM audio signal is recorded on the same track as the video signal, a section of the tape that is wound on the cylinder would extend over an arc which would amount to 331 degrees, a value 3/2 times greater than the standard 221 degrees. Therefore, the clearance L1 between each of the tape guide posts 104a and 104b and the circumference of the rotary cylinder 102 and the distance L2 between these guide posts become too small for conventional manufacturing tolerances.

Figure 5:
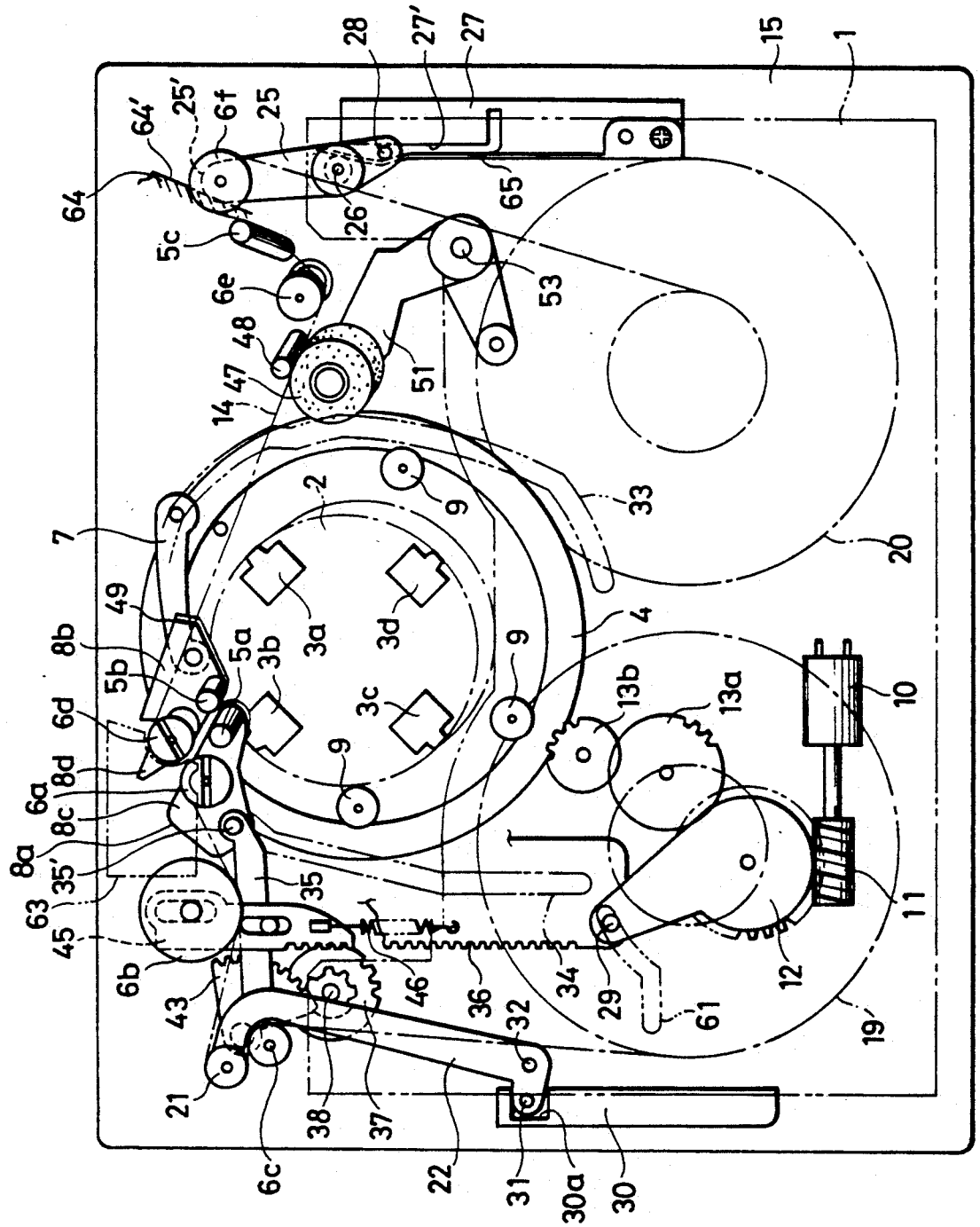
FIG. 5 is a plan view of a video tape recorder of the present invention showing a section of tape being wound on the circumference of a rotary cylinder.

Referring now to FIG. 5, a video tape recorder according to an embodiment of the present invention is illustrated. A portion of magnetic tape 14 pulled out of an 8-mm video cassette 1 is wound over an arc of 331.5 degrees of the circumference of a small diameter, rotary cylinder 2 having four video heads 3a, 3b, 3c and 3d angularly spaced apart by 90 degrees. The axis of rotation of the cylinder 2 is tilted to the vertical to allow the transducer heads to scan tape obliquely in a well known manner. Each video head projects slightly outwards from the circumferential surface of the rotary cylinder 2 for making contact with the tape. A tape loading ring 4 is disposed around the circumference of the rotary cylinder 2. The inner circumference of the tape loading ring 4 is in pressure contact with a set of rollers 9 and the outer circumference thereof is in mesh with a coupling wheel 13b which is in mesh with another coupling wheel 13a, the latter being driven by a drive wheel 12. Wheel 12 is in mesh with a worm gear 11 mounted on the rotary shaft of a loading motor 10 and has an arm portion formed with a cam pin 29 engaging with a guide groove 61 in a movable chassis 16. By the rotation of wheel 12, movable chassis 16 is moved by the cam pin 29 and hence the cassette 1 is moved in a direction toward or away from the rotary cylinder 2. Tape loading ring 4 is rotated by motor 10 to form a loop of tape around the circumference of the rotary cylinder 2.

Figure 7:
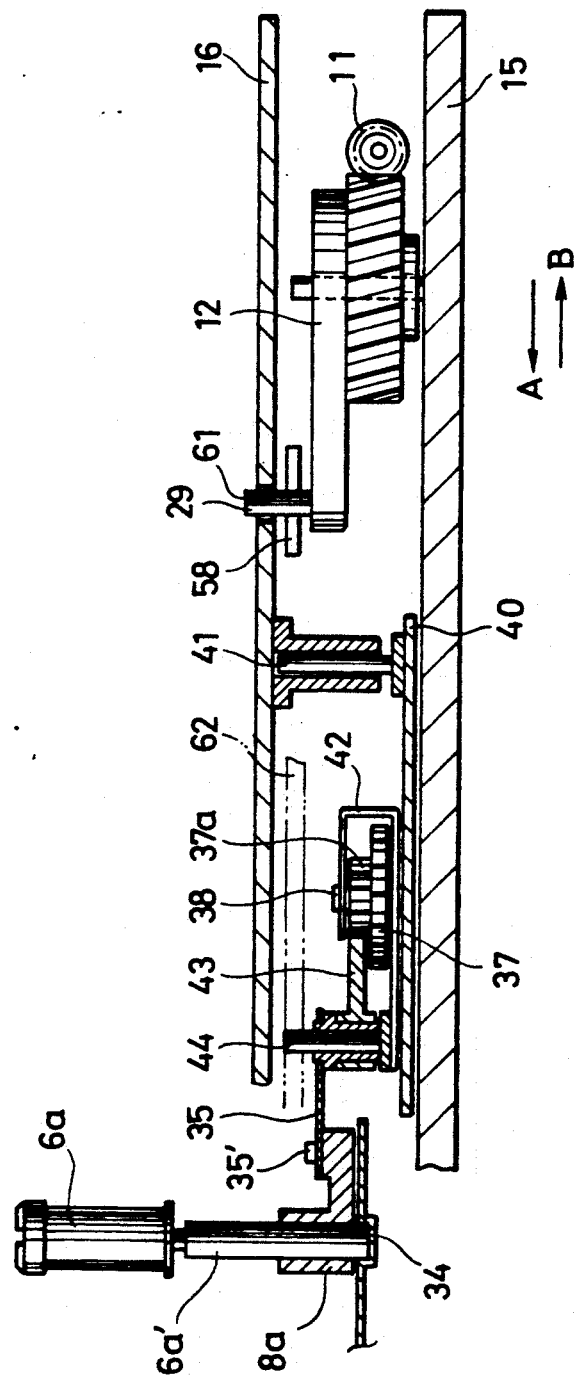
FIG. 7 is a side view of the first tape loading mechanism.

First, second and third inclined tape loading posts 5a, 5b and 5c are provided, which are tilted to the vertical. The first and second inclined loading posts 5a and 5b are respectively mounted on rotatable supports 8a and 8b, and the third inclined loading post 5c is fixedly mounted on a stationary chassis 15 which is located below the movable chassis 16 as illustrated in FIG. 7. As will be described, the inclined loading posts 5a and 5b are locked firmly in position when the tape has been wound on the cylinder 2 with their axes extending parallel with the axis of rotation of cylinder 2. Movable support 8b is pivotally mounted on one end of an arm 7 which is engaged with a takeup-side loading guide groove 33 formed in stationary guide plates 33a, 36a fitted to the stationary chassis 15 (see FIG. 16). The other end of arm 7 is pivotally connected to the tape loading ring 4. Also mounted on the movable supports 8a and 8b are vertically extending tape guide rollers 6a and 6d. Tape guide roller 6a is pivoted on a shaft 6a' (FIG. 7) which extends through the movable support 8a into engagement with a supply-side loading guide groove 34 formed in a toothed stationary guide plates 36, 36a (FIG. 16) fitted to the stationary chassis 15.

Support 8a is mounted on one end of a first loading arm 35, the other end of which is coupled to a pivot 44 which is arranged to engage with a groove 62 during a predetermined length of travel of the movable chassis 16. As seen in FIG. 7, a second loading arm 42, which is generally of a folded structure, has a lower stem extending horizontally below a first toothed wheel 37 and an upper stem extending horizontally over an auxiliary toothed wheel 37a, the wheels 37 and 37a being integrally coupled to a pivot 38 which extends from the upper stem of the second loading arm 42 through its lower stem down to a movable loading plate 40 which is movable with the movable chassis 16. First toothed wheel 37 is arranged to initially engage with the toothed stationary member 36 and subsequently with a spring-loaded toothed member 45 and the auxiliary toothed wheel 37a is in mesh with a second toothed wheel 43. Wheel 43 is rigidly coupled to the first loading arm 35 and rotatable about pivot 44 which is mounted on the distal end of the lower stem portion of second loading arm 42. Second loading arm 42 is thus freely rotatable about pin 38 with a movement of first loading arm 35. Pivot 44 engages with a groove 62 (FIG. 6) to prevent the rotation of second loading arm 42 during a predetermined length of travel of the loading plate 40, while allowing the first loading arm 35 to rotate counterclockwise about pivot 44. Toothed wheel 37 is thus movable with the movable chassis 16. With the movement of chassis 16, wheel 37 is in mesh with the toothed stationary member 36 (FIG. 16) and pivot 44 is engaged with groove 62 so that wheels 37 and 37a rotate clockwise causing counterclockwise rotation of wheel 43 and first loading arm 35 about pivot 44. Wheel 37 is subsequently in mesh with the spring-loaded toothed member 45 when pivot 44 disengages from contact with groove 62, whereupon the second loading arm 42 is free to rotate about pin 38. Toothed member 45 is coupled by a spring 46 to the stationary toothed member 36 and constantly urged in the direction of arrow B in FIG. 6 to give a clockwise thrust to wheel 37 and hence a counterclockwise thrust to the first loading arm 35 when pivot 44 is disengaged from contact with groove 62.

Figure 6:
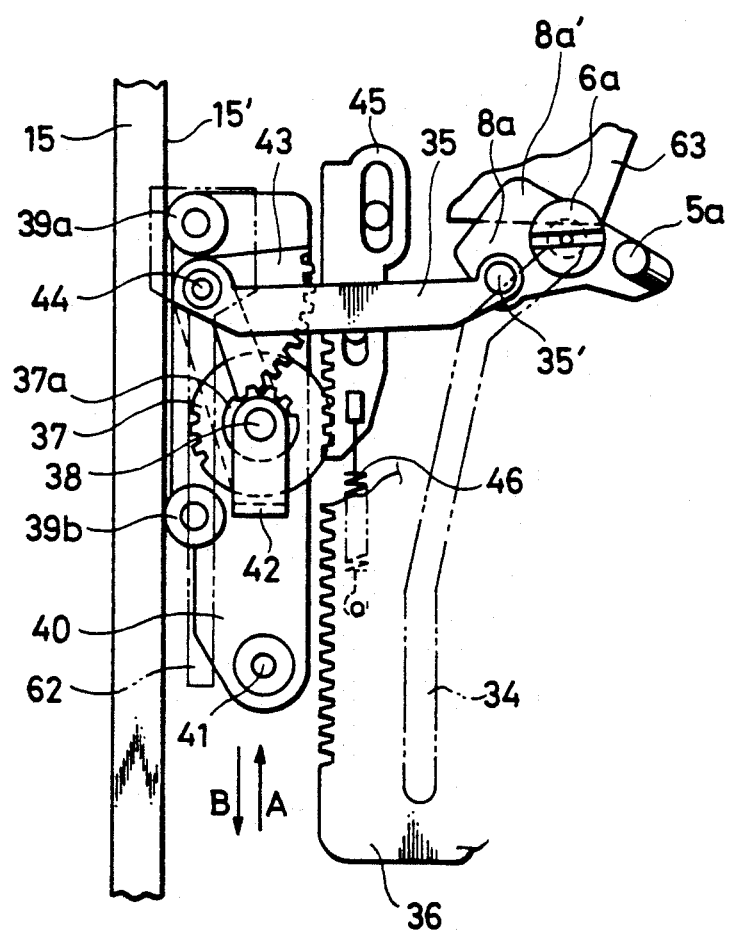
FIG. 6 is a plan view of a first tape loading mechanism of the present invention.

Rollers 39a and 39b are mounted on the loading plate 40 in contact with a guide wall formed by a vertically extending portion 15' of the stationary chassis 15 to allow loading plate 40 to move in opposite directions as indicated by arrows A and B. When the loading plate 40 is moved in the direction of arrow A, the toothed member 45 comes into mesh with the toothed wheel 37. When the tape has been wound on the rotary cylinder 2 with the support 8a being locked in position, the loading plate 40 moves with the toothed wheel 37 in the direction of arrow A. As seen in FIGS. 6 and 7, the loading plate 40 is coupled by a connecting pin 41 to the movable chassis 16.

Figure 8:
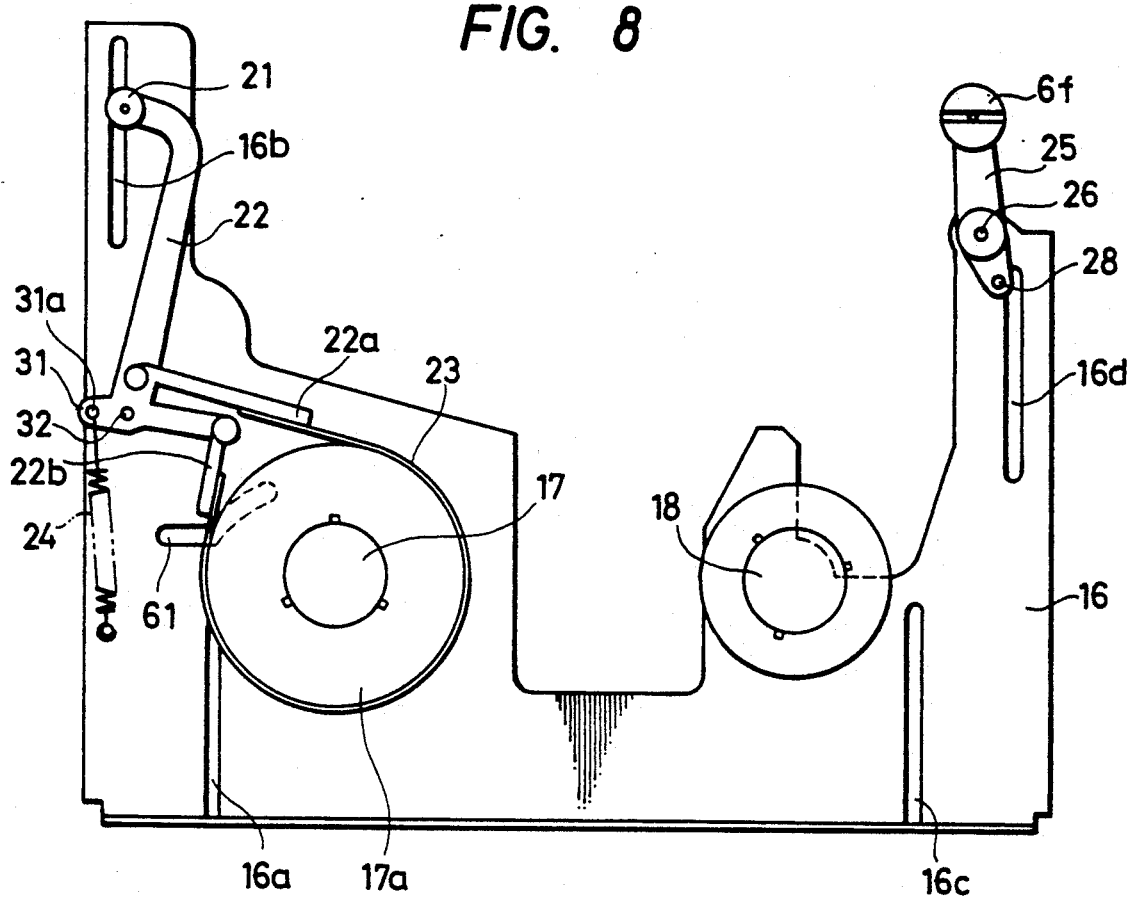
FIG. 8 is a plan view of a movable chassis of the invention.

Referring to FIG. 8, the movable chassis 16 has a generally U-shaped structure. The chassis 16 has a pivot pin 26 on which is pivotally mounted an arm 25 having a tape guide roller 6f. The arm 25 is further provided with a cam pin 28 which extends downwards and engages with a guide groove 27' formed between a leaf spring 65 and a side wall of a guide member 27, both of which are secured to the stationary chassis 15. Movable chassis 16 is formed with parallel guide grooves 16a, 16b, 16c and 16d with which corresponding guide pins, not shown, of the stationary chassis 15 are respectively engaged to allow chassis 16 to move with respect to the stationary chassis 15. On the left-side wall portion of the movable chassis 16 is a tension arm 22 rotatably mounted on a pivot 32. Tension arm 22 has a first extension arm 22a which is coupled to one end of a steel band 23, the other end of which is coupled to a second extension arm 22b of the tension arm 22. The steel band is slip-frictionally wound on a brake drum portion 17a of a tape-supply spindle 17 to produce friction on the circumference of the brake drum. Tension arm 22 is formed with a cam 31 on which a pin 31a is provided. A spring 24 extends between the pin 31a and the chassis 16 to bias the tension arm 22 in a counterclockwise direction. Arm 22 carries a tension adjusting post 21 at one end which is brought into contact with running tape to keep its tension constant by applying brake to the brake drum 17a. A tape-takeup spindle 18 is located on the chassis 16. The cassette 1 is mounted on a cassette loading device of a known design, not shown, to engage its supply and takeup reels with the supply and takeup spindles 17 and 18, respectively. During fast forward and rewind modes, cam 31 of the tension arm 22 engages a notch 30a formed in a tension arm release member 30 located on the stationary chassis 15 as seen in FIG. 5 to prevent the tension arm 22 from contacting with the fast-running tape.

Figure 9:
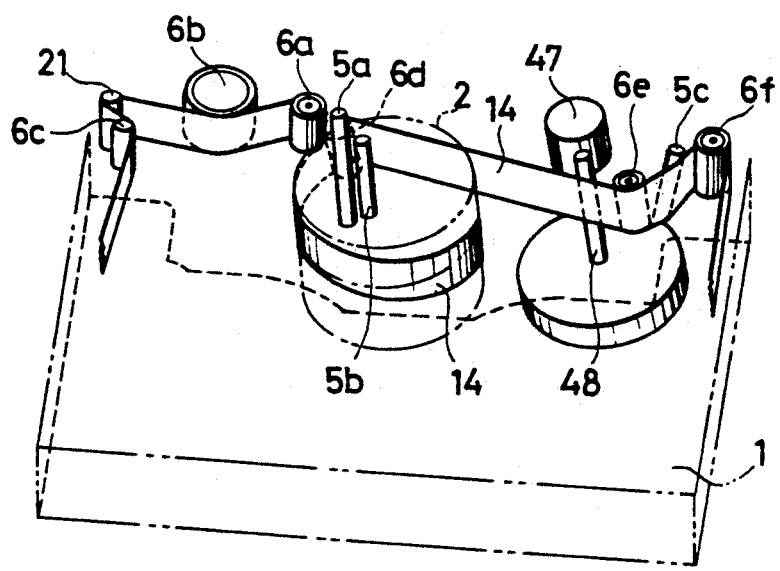
FIG. 9 is a perspective view of a tape transport mechanism of the invention.

In FIG. 9, a portion of the tape withdrawn from the supply reel 19 is moved past tape guide post 6c, tension post 21, tape guide rollers 6b and 6a to the inclined post 5a. The edges of that portion of the tape which extends from the cassette to the inclined post 5a run parallel to the horizontal. After the tape has been withdrawn from the cassette, the inclined posts 5a and 5b are locked in position on the first chassis 15 with their axes running parallel with the axis of rotation of the cylinder 2. The portion of the tape 14 that is looped on the cylinder 2 descends as it is guided along a tape leading edge 50a (FIG. 13) formed around the circumference of the cylinder 2 by an upper edge of a stationary lower cylinder 50, and then gradually ascends after leaving the tape guide roller 6d and comes into engagement between the pinch roller 47 and capstan 48, and is moved past the guide post 6e. At this point, the tape 14 assumes the same vertical position as the takeup reel 20 of the cassette 1. Tape 14 is then moved past the inclined post 5c which is so tilted that the tape face runs parallel to the vertical, and then looped around the tape guide roller 6f and taken up by the reel 20.

Figure 10A:
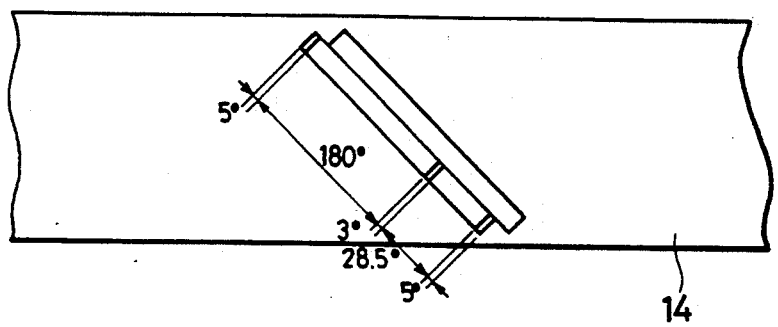
FIGS. 10a and 10b are schematic illustrations of an 8-mm video recording format.
Figure 10B:
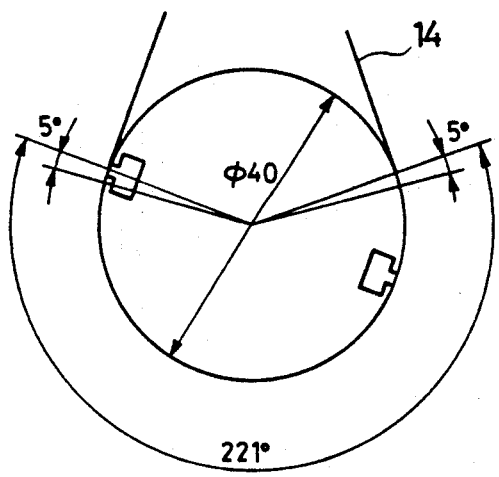
Figure 11:
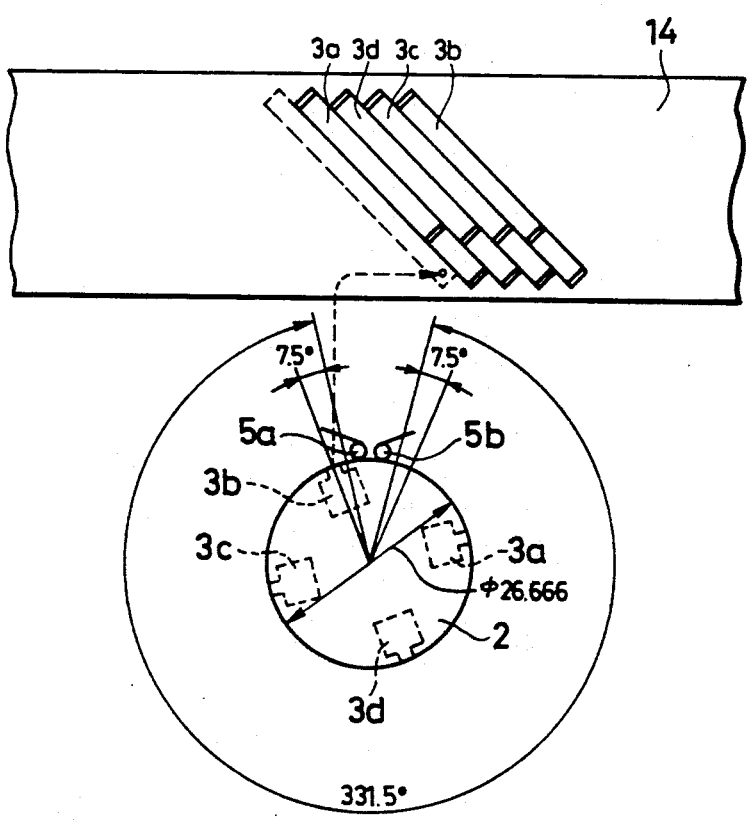
FIG. 11 is a plan view of the rotary cylinder of the invention with a tape recording format showing successive tracks on a magnetic tape.

As shown in FIGS. 10a and 10b, the standard 8-mm video recording tape format for two-head cylinders specifies that a PCM audio signal be recorded over a track section occupying an arc of 28.5 degrees in succession to a video track section which occupies an arc of 180 degrees. The section of an 8-mm width tape that is wound on a two-head cylinder extends an arc of 221 degrees. To meet this specification with a four-head, small diameter rotary cylinder 2, it is necessary that the tape be wound over an arc of 331.5 degrees which is 3/2 times greater than that required for two-head cylinders as shown in FIG. 11. As indicated, the direction of tape transport must be sharply changed at the loading post 5a as well as at the loading post 5b to prevent successive portions of tape from being overlapped.

Figure 12:
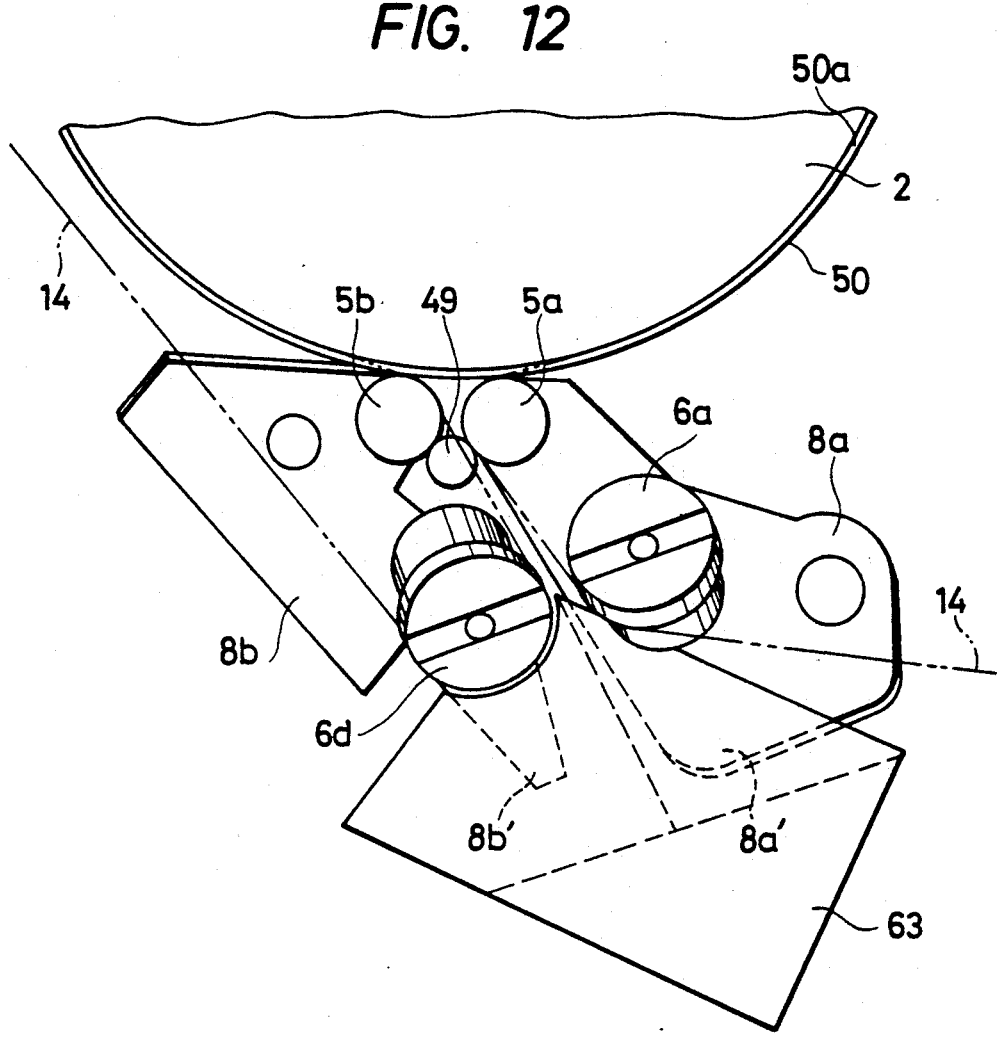
FIG. 12 is a plan view of a loading post locking mechanism of the present invention.
Figure 13:
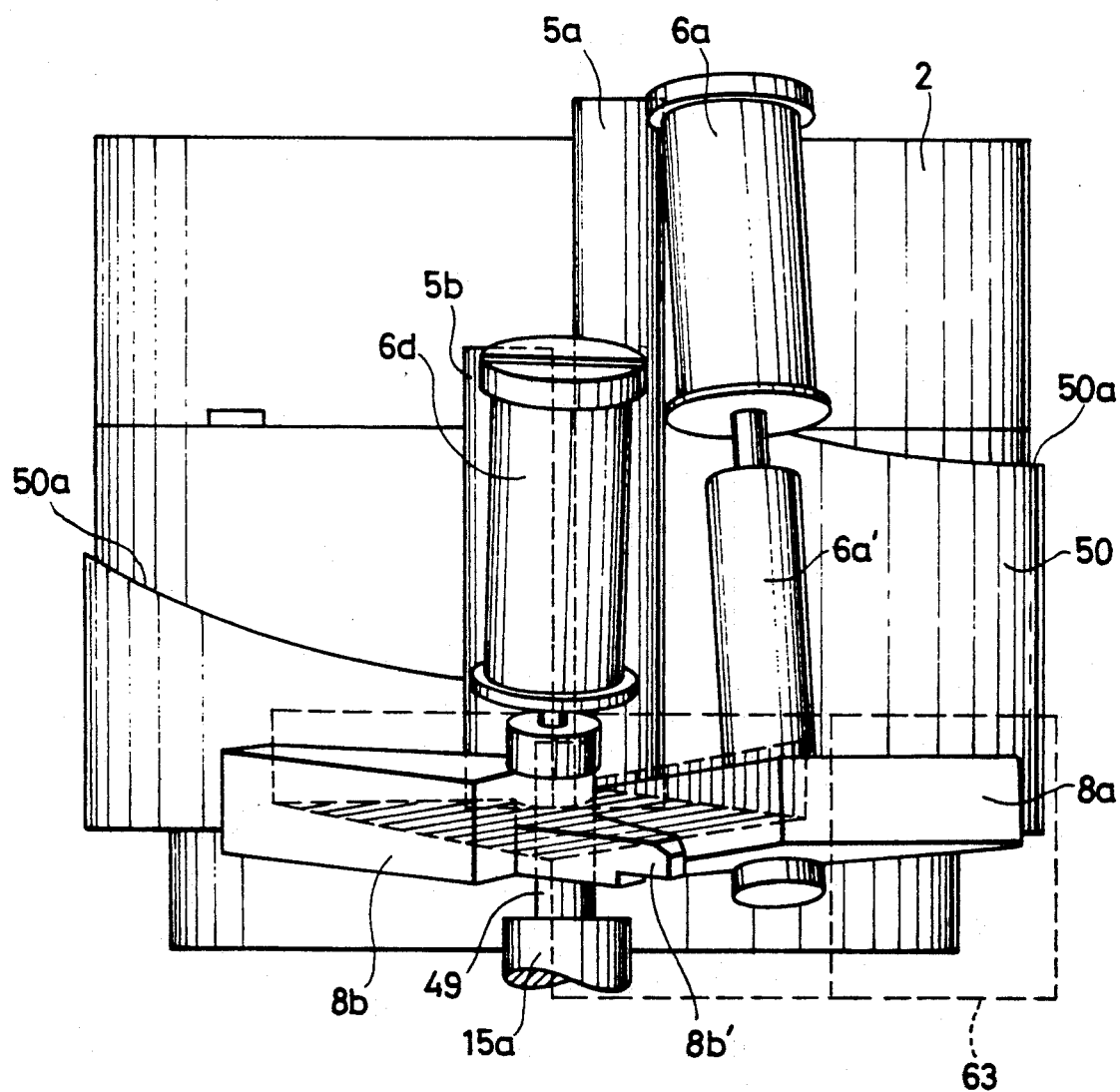
FIG. 13 is a front view of the loading post locking mechanism.
Figure 18:
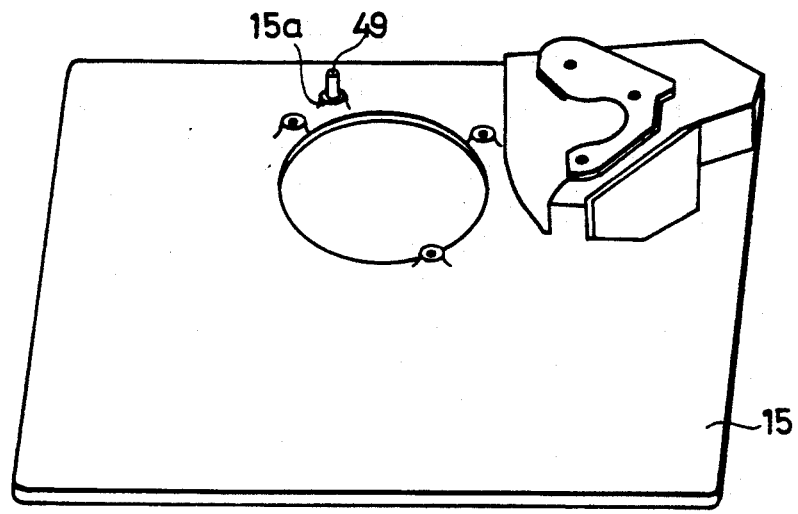
FIG. 18 is a perspective view of a stationary chassis of the invention.

Sharp changes in tape transport direction can be achieved by locking the tape loading posts 5a and 5b firmly in position with their axes running parallel with the center axis of the rotary cylinder 2. This is achieved by the provision of a stopper pin 49 shown in FIGS. 12, 13 and 18. The stopper pin 49 is mounted on a raised portion 15a of the stationary chassis 15 (FIG. 18) with its vertical axis being parallel with the center of rotation of cylinder 2. As seen in FIG. 13, the stationary lower cylinder 50 is slightly offset outwards from the circumference of the rotary cylinder 2 to create the tape leading edge 50a. Stopper pin 49 is located in such a position that, immediately after a loop of tape is wound on the cylinder 2, the movable supports 8a and 8b are brought close to each other and each of the inclined loading posts 5a and 5b comes into pressure contact between the circumferential wall of stationary lower cylinder 50 and the cylindrical wall of stopper pin 49, as best seen in FIG. 13. With this arrangement, the inclined loading posts 5a and 5b can be locked firmly in place during tape operation. Since the location of stopper pin 49 can be precisely determined with respect to the circumference of stationary lower cylinder portion 50, the horizontal positions of the loading posts 5a and 5b during tape operation, and hence the distance between each of these posts and the circumferential surface of the rotary cylinder 2 can be determined precisely on the order of several hundreds of micrometers.

Figure 12A:
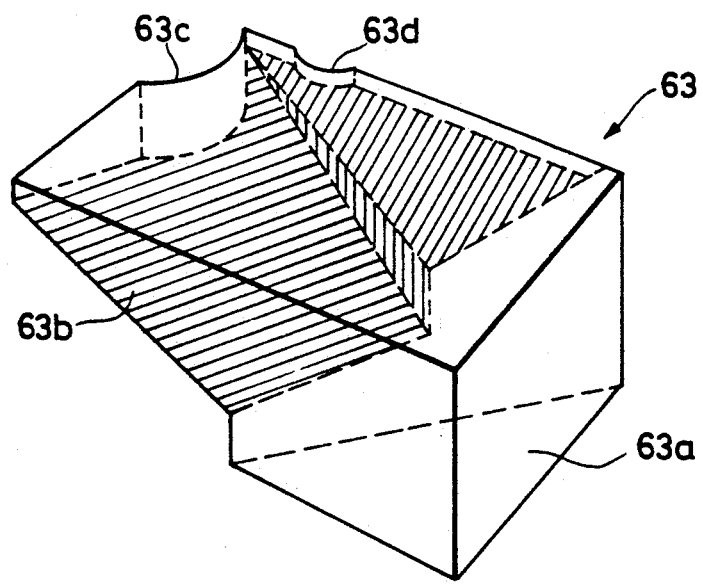
FIG. 12a is a perspective view of a stopper block.

According to a preferred embodiment, the vertical positions of movable supports 8a and 8b should be determined with precision. This is accomplished by the use of a stopper block 63 which is fixedly mounted on the stationary chassis 15 in a position adjacent the stopper pin 49. As shown in FIGS. 12 and 12a, the stopper block 63 has a base portion 63a and an upper portion 63b which is tapered in opposite directions to permit edge portions 8a' and 8b' of the movable supports 8a and 8b to provide sliding contact with the tapered surfaces as they approach the stopper pin 49 and held firmly in position. The upper portion 63b of the block 63 is formed with cutouts 63c and 63d which conform to the circumference of the tape guide rollers 6d and 6a. In this way, the vertical positions of the loading posts 5a and 5b can also be precisely determined.

Figure 19A:
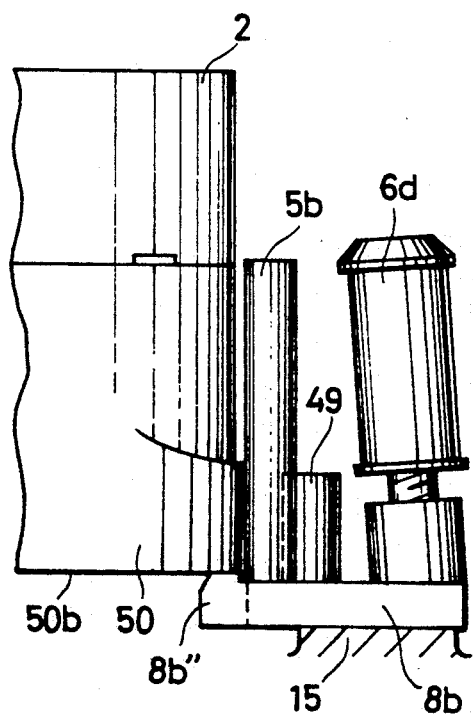
FIGS. 19a and 19b are side views of an alternative embodiment of the loading post locking mechanism.
Figure 19B:
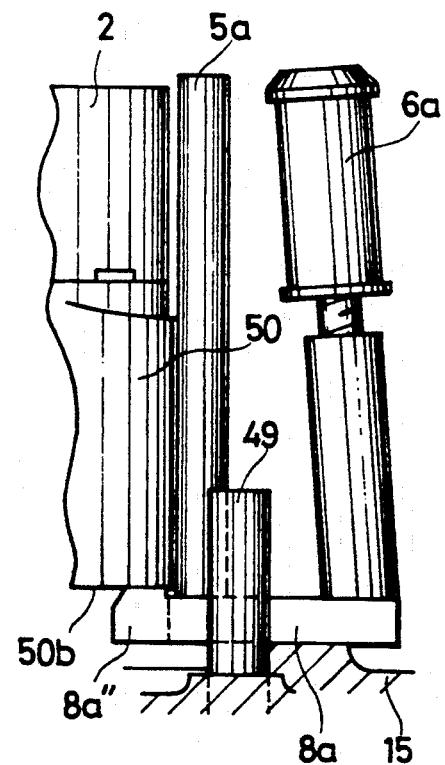

Alternatively, movable supports 8a and 8b are formed with slide contact portions 8a" and 8b", respectively, as shown in FIGS. 19a and 19b. Each of the portions 8a" and 8b" is tapered in a direction toward the stationary cylinder 50 as they approach the end of their travels during tape loading operation and comes into sliding contact with a lower edge 50b of the stationary cylinder 50. In this way, the vertical positions of the supports 8a and 8b can be determined with precision.

Figure 14:
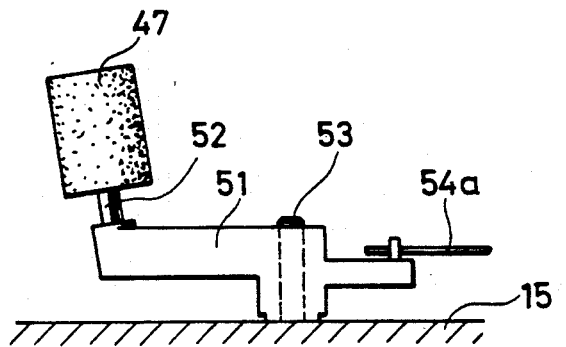
FIG. 14 is a side view of a pinch roller arm.

As seen in FIG. 14, a pinch roller 47 is mounted on an inclined shaft 52 to align the axis of the pinch roller 47 to the plane of the running tape. Shaft 52 is located at one end of a pinch roller arm 51 which is pivotally mounted on a shaft 53. A capstan 48 has an inclined axis parallel to the axis of the pinch roller 47.

Figure 15:
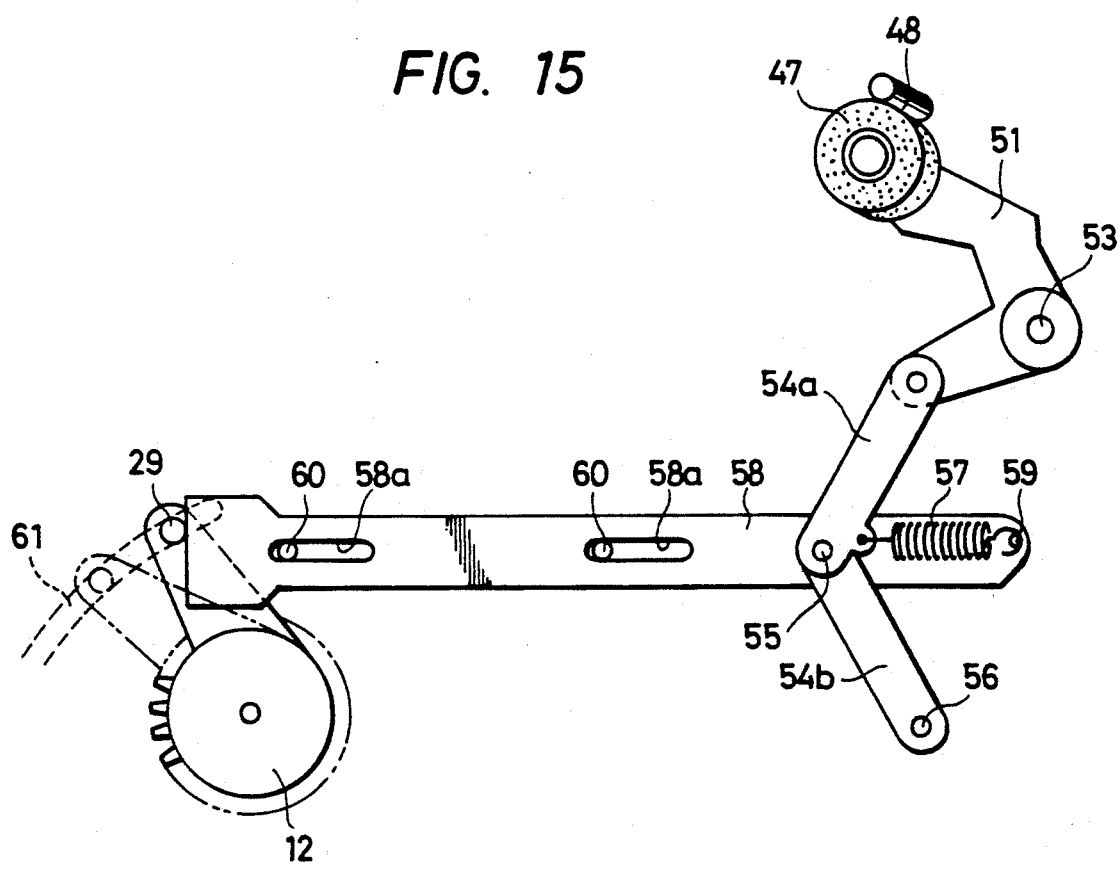
FIG. 15 is a plan view of a moving mechanism for the pinch roller arm.

In FIG. 15, a pair of levers 54a and 54b are pivotally coupled at each end by a pivot 55 on a rod 58. Rod 58 has elongated holes 58a in which guide pins 60 are engaged to permit it to move over a limited length. Lever 54a is pivotally connected at the other end to the pinch roller arm 51 and lever 54b is pivotally connected to a stationary pin 56 fixed to the stationary chassis 15. Lever 54a is urged at a point near pivot point 55 by a spring 57 secured to a pin 59 on rod 58. The leftmost end of the rod 58 is in abutment contact with pin 29 mounted on an arm portion of toothed wheel 12 so that rod 58 is pushed rightward when the loading motor 10 is energized. Levers 54a, 54b and spring 57 form a toggle to cause rod 58 to move in opposite directions along its length.

The operation of the video tape recorder of the present invention will now be described.

Figure 16:
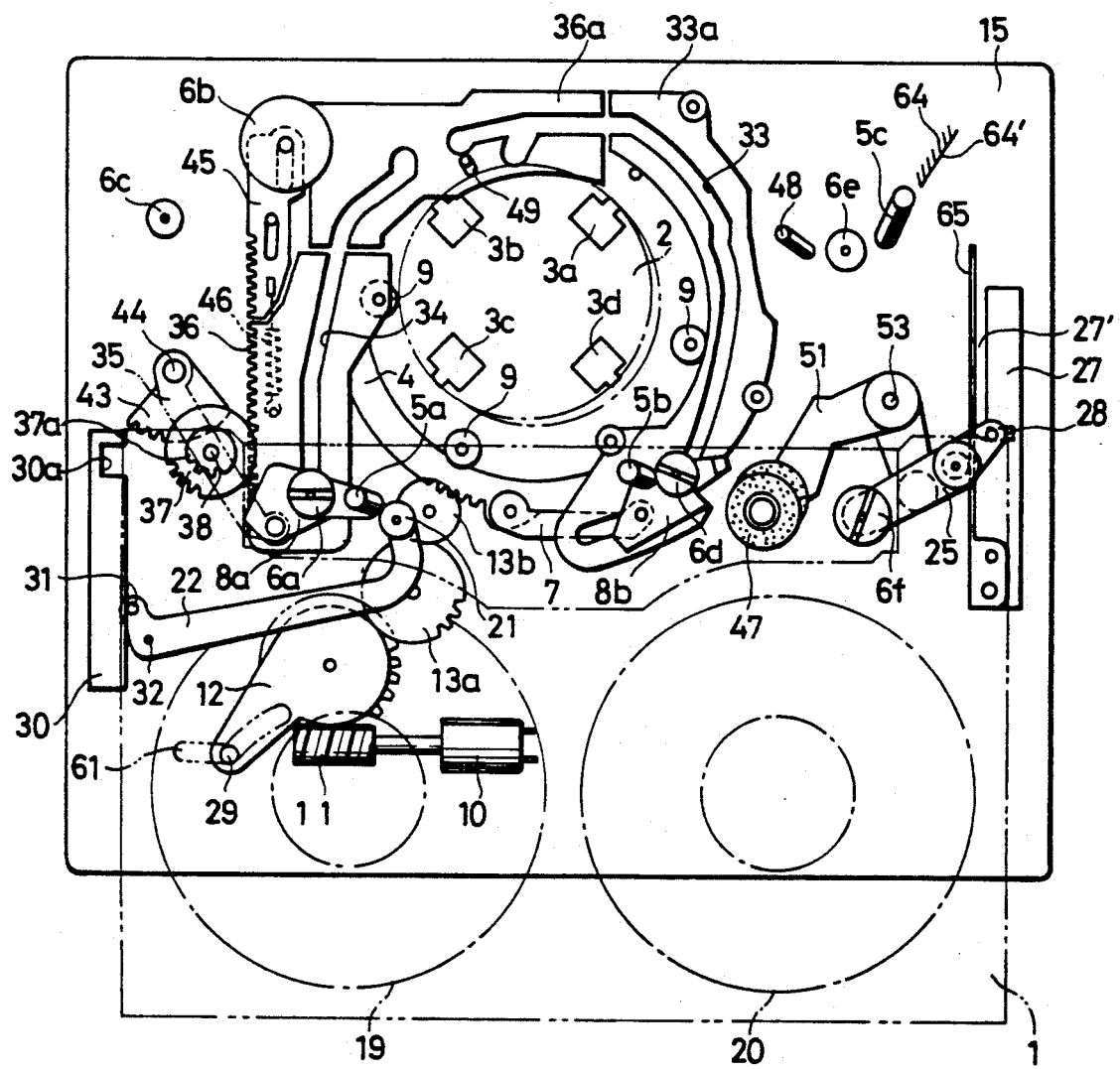
FIG. 16 is a plan view of the video tape recorder of the invention when a tape cassette is initially loaded into the apparatus.

Prior to the insertion of a cassette to the cassette insertion slot of the apparatus, movable supports 8a and 8b are located near the insertion slot as shown in FIG. 16. When a cassette 1 is inserted to the slot, the cassette sensing device activates the loading motor 10, causing the toothed wheel 12 to turn clockwise.

The rotation of wheel 12 is transmitted by gears 13a and 13b to the loading ring 4 and the support 8b is moved along guide groove 33 and tape guide roller 6d catches a portion of the tape and pulls it out of the cassette to the position of FIG. 5. When the support 8b approaches the stopper pin 49, portion 8b' of the support 8b slides against the tapered surface of the stopper 63 and the loading post 5b comes into pressure contact between the circumference of the lower stationary cylinder 50 and the stopper pin 49 and firmly locked in position with its axis extending parallel to the axis of the cylinder 2. Simultaneously, the rotation of wheel 12 causes cam pin 29 to slide along the cam groove 61 and the movable chassis 16 is moved in a direction away from the cassette insertion slot and hence the cassette 1 is moved to the rotary cylinder 2. With the movement of the movable chassis 16, the tension arm 22 is moved along the guide 30 and its cam pin 31 comes into engagement with notch 30a of the guide 30, whereupon the tension arm 22 rotates in a counterclockwise direction about the cam pin 31. When cam pin 29 reaches an end of the arcuate guide groove 61, the movement of the cassette ceases and the tension arm 22 is locked in position by engagement with cam notch 30a.

Figure 17:
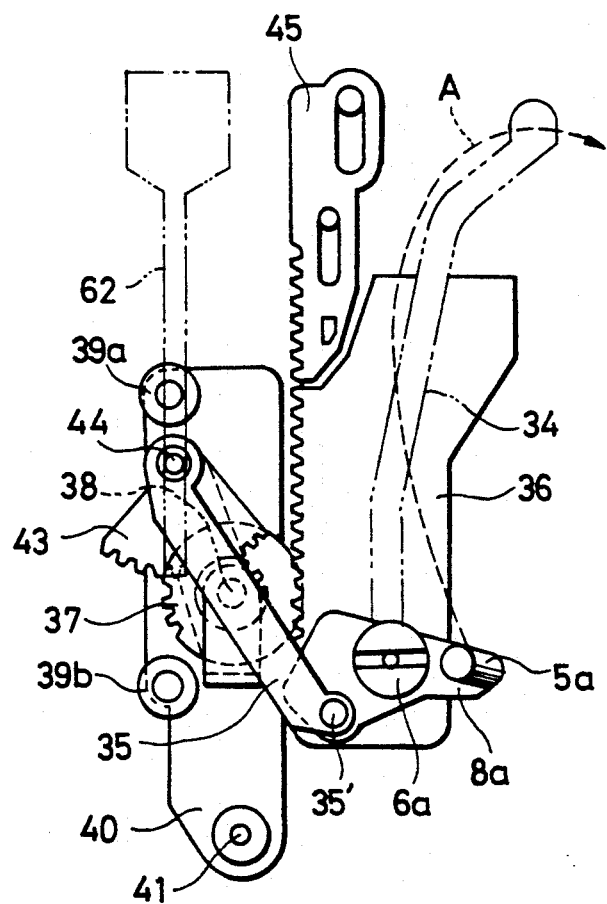
FIG. 17 is a plan view of the first tape loading mechanism with a tape loading path followed by a first inclined post.

Simultaneously with the operation just described, the movement of the chassis 16 causes the loading plate 40 to move forward, causing the toothed wheel 37 to rotate clockwise by engagement with the toothed edge of the stationary toothed member 36 and hence the gear 43 and loading arm 35 rotate counterclockwise with the forward movement of the chassis 16. As a result, the loading post 5a catches a portion of the tape and pulls it out of the cassette following a path indicated by arrow A in FIG. 17, while the tape guide support 8a moves along the guide groove 34. This arrangement ensures that the path taken by the loading post 5a be spaced a sufficient distance from the circumference of the rotary cylinder 2, while at the same time allowing the loading post 5a to rapidly access the cylinder 2 as it approaches it.

Because of the parallel arrangement of the loading posts 5a and 5b with the center of rotation of cylinder 2, the point at which the tape makes an approaching turn for contacting with cylinder 2 and the point at which it makes a leaving turn for disengaging from it can be located in proximity to the circumference of the cylinder 2, and therefore a smooth transition in the orientation of the plane of tape can be ensured at the approaching and leaving points. Therefore, an 8-mm format, compact four-head video tape recorder can be implemented.

When the tape guide support 8a is moving along the guide groove 34, the coupling arm 42 and loading arm 35 are prevented from rotating about the axes of respective pins 38 and 44 due to the engagement of pin 44 with groove 62 until the support 8a reaches the position of FIG. 6. With this arrangement, variabilities in the distance between pins 35' and 38 due to manufacturing tolerances can be absorbed by loading arms 35 and 42.

With the pin 44 being disengaged from contact with groove 62 (FIG. 6), toothed member 45 is pulled in the direction of arrow B by spring 46, giving a clockwise thrust to the toothed wheel 37 and hence a counterclockwise thrust to loading arm 35. Pins 35', 38, loading post 5a and spring-loaded toothed member 45 form a toggle by which the support 8a is pressed against the tapered surface of stopper block 63. As described earlier, the vertical position of support 8a is determined by having its portion 8a' pressed tightly against a tapered surface of stopper block 63 (FIGS. 12 and 13). Similarly, the vertical position of support 8b is determined by having its portion 8b' pressed tightly against a tapered surface of stopper block 63.

With the cam pin 29 approaching the end of groove 61 (see FIG. 15), it comes into abutment contact with one end of rod 58 and urges it rightward against the spring 57, causing the toggle formed by pivoted arms 54a and 54b to spread apart from each other, giving a clockwise thrust to the pinch roller 47 about axis 53 and enabling the tape to be transported at a constant speed by capstan 48 by engagement with pinch roller 47.

Arm 25 is mounted on the movable chassis 16 as described earlier with reference to FIG. 8 and the cam pin 28 on arm 25 is engaged with a corner of guide groove 27' as shown in FIG. 16. With the movement of the chassis 16 by motor 10, the arm 25 is rotated clockwise with its cam pin 28 acting as a pivot point until its length becomes almost parallel with the length of guide groove 27' and further moved forward as cam pin 28 is guided through groove 27'. Arm 25 has a cylindrical contact face 25' (FIG. 5) which is concentric with the cylindrical surface of the tape guide roller 6f. When the movable chassis 17 reaches the end of its travel, the contact face 25' contacts with a contact surface 64' of a guide block 64 which is fixed to the stationary chassis 15. This contact surface 64' is parallel to the plane of tape 14 moving past the inclined loading post 5c. Because of this face-to-face contact, the plane of tape 14 is made parallel to the cylindrical surface of the loading post 5c regardless of variabilities of the stop position of movable chassis 16 which may arise due to manufacturing tolerances.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A magnetic tape recording and/or reproducing apparatus comprising:
   a rotary cylinder having a plurality of magnetic transducer heads on a cylindrical surface thereof and rotating about an axis tilted to the vertical;
   a first tape loading means including a first post movable from a first initial position in which said first post is engageable with a tape from a tape cassette to a first terminal position adjacent said rotary cylinder;
   a second tape loading means including a second post movable from a second initial position in which said second post is engageable with said tape to a second terminal position adjacent said rotary cylinder;
   drive means for driving said first and second tape loading means so that said first and second posts are moved from said first and second initial positions to said first and second terminal positions to cause said tape to be pulled out of said cassette and form an arc of a predetermined angle on the cylindrical surface of said rotary cylinder;
   locking means for locking said first and second posts in said first and second terminal positions in response to the formation of said arc such that axes of said first and second posts are parallel with the axis of rotation of said rotary cylinder; and
   a third post provided between said second post and said cassette for guiding said tape,
   said third post inclined at least in the direction of traveling of said tape reaching said third post from said second post such that a face of said tape runs parallel to a predetermined datum plane of said cassette without development of twisting of said tape around said third post.

2. A magnetic tape recording and/or reproducing apparatus as claimed in claim 1, wherein said rotary cylinder is rotatable on a stationary cylinder having a center axis coaxial with a center of rotation of said rotary cylinder, wherein said locking means is arranged to catch with a portion of said stationary cylinder to lock said first and second posts.

3. A magnetic tape recording and/or reproducing apparatus as recited in claim 1 wherein said third post is inclined such that the face of said tape runs parallel to a vertical direction.

4. A magnetic tape recording and/or reproducing apparatus as recited in claim 1, further comprising a fourth post between said second and third posts in order to function, together with said third post, to cause the face of said tape to run parallel to said predetermined datum plane.

5. A magnetic tape recording and/or reproducing apparatus as recited in claim 1 wherein said locking means includes for locking said first and second post in said first and second terminal positions such that axes of said first and second posts are three-dimensionally parallel with the axis of rotation of said rotary cylinder.

6. A magnetic tape recording and/or reproducing apparatus as recited in claim 5, wherein said drive means operates to cause said first and second posts to move to said first and second terminal positions to cause said tape to form an arc of at least 270° on the cylindrical surface of said rotary cylinder.

7. A magnetic tape recording and/or reproducing apparatus comprising:
   a rotary cylinder having a plurality of magnetic transducer heads on a cylindrical surface thereof and rotatable about an axis tilted to the vertical on a stationary cylinder coaxial with the axis of said rotary cylinder;
   a first tape loading means including a first post movable from a first initial position in which said first post is engageable with a tape from a tape cassette to a first terminal position adjacent said rotary cylinder;
   a second tape loading means including a second post movable from a second initial position in which said second post is engageable with said tape to a second terminal position adjacent said rotary cylinder;
   drive means for driving said first and second tape loading means posts from said initial positions to said terminal positions to cause said tape to be pulled out of said cassette and form an arc of a predetermined angle on the cylindrical surface of said rotary cylinder; and
   locking means for locking said first and second posts in said first and second terminal positions in response to the formation of said arc such that axes of said first and second posts are parallel with the axis of rotation of said rotary cylinder, said locking means including a stationary positioning member located adjacent said stationary cylinder, each of said first and second posts pressure contacting between said stationary positioning member and a circumferential surface of said stationary cylinder.

8. A magnetic tape recording and/or reproducing apparatus as claimed in claim 1 or 7, wherein said rotary cylinder comprises a set of four magnetic transducer heads mounted on the circumference thereof with an angular spacing of 90 degrees and said tape is wound over an arc of 331.5 degrees on the cylindrical surface of the rotary cylinder.

9. A magnetic tape recording and/or reproducing apparatus as claimed in claim 7, wherein said stationary positioning member comprises a cylindrical pin located adjacent said rotary cylinder.

10. A magnetic tape recording and/or reproducing apparatus comprising:
    a rotary cylinder having a plurality of magnetic transducer heads on a cylindrical surface thereof and rotatable on a stationary cylinder about an axis tilted to the vertical, said stationary cylinder having a center axis coaxial with the axis of rotation of said rotary cylinder;
    a first tape loading means including a first post movable from a first initial position in which said first post is engageable with a tape of a tape cassette to a first terminal position adjacent said rotary cylinder;
    a second tape loading means including a second post movable from a second initial position in which said second post is engageable with said tape to a second terminal position adjacent said rotary cylinder;
    drive means for moving said first and second tape loading means so that said first and second posts are moved from said initial positions to said terminal positions to cause said tape to be pulled out of said cassette and form an arc of a predetermined angle on the cylindrical surface said rotary cylinder; and
    locking means for locking said first and second posts in said terminal positions in response to the formation of said arc, said locking means comprising a stationary positioning member located adjacent said stationary cylinder and means for pressing each of said first and second posts against said stationary positioning member and said stationary cylinder such that axes of said first and second posts are parallel with the axis of rotation of said rotary cylinder.

11. A magnetic tape recording and/or reproducing apparatus as claimed in claim 7 or 10, wherein said first and second tape loading means further include first and second supports on which said first and second posts are respectively fixedly mounted and wherein said locking means comprises a second stationary positioning member located adjacent said stationary cylinder, each of said first and second supports being arranged to slidably contact with said second stationary positioning member and locked in fixed vertical positions when said first and second posts are respectively moved to said first and second terminal positions.

12. A magnetic tape recording and/or reproducing apparatus as claimed in claim 7 or 10, wherein said stationary cylinder is formed with a contact surface for defining a vertical position, and wherein said first and second tape loading means further include first and second supports on which said first and second posts are respectively fixedly mounted, each of said first and second supports being arranged to slidably contact with said contact surface of said stationary cylinder and locked in fixed vertical positions when said first and second posts are respectively moved to said first and second terminal positions.

13. A magnetic tape recording and/or reproducing apparatus comprising:
    a stationary chassis having first and second loading guides (33,34) and a toothed edged (36);
    a rotary cylinder mounted on said stationary chassis and having a plurality of magnetic transducer heads on a cylindrical surface thereof and rotatable about an axis tilted to the vertical;
    a movable chassis on which a cassette is placed;
    drive means for moving said movable chassis toward said rotary cylinder;
    a first tape loading means comprising:

a first toothed wheel (37,37a) movable with said movable chassis and rotatable about a first pivot (38) by engagement with said toothed edge (36);

a second toothed wheel (43) movable with said movable chassis and rotatable about a second pivot (44) by engagement with said first toothed wheel (37a);

a first loading arm (35) rotatable at one end thereof by rotation of said second toothed wheel (43) and mounting a first post (5a) at the other end thereof, the other end of said first loading arm (35) engaging with said first loading guide (34), said first loading arm (35) being movable with said movable chassis so that said first post (5a) pulls a tape out of said cassette and forms a first half of arc on the cylindrical surface of said rotary cylinder;

a second loading arm (42) rotatable at one end thereof about said first pivot (38) and mounting at the other end thereof said second pivot (44); and guide means (62) for engaging with said second pivot (44) to prevent rotation of said second loading arm (42) about said first pivot (38) when said movable chassis is moving over a predetermined length of travel toward said rotary cylinder;

a second tape loading means including a second post for pulling said tape out of said cassette along said second loading guide and forming a second half arc on the cylindrical surface of said rotary cylinder; and first and second locking means for locking said first and second post in positions adjacent said rotary cylinder such that said first and second posts are parallel with the center of rotation of said cylinder when said first and second halves of arc are formed on the circumference of said rotary cylinder.

14. A magnetic tape recording and/or reproducing apparatus as claimed in claim 13, wherein said second tape loading means comprises a loading ring coaxially rotatable by said drive means about the center of rotation of said rotary cylinder and an arm pivoted at one end thereof on said loading ring and mounting said second post (5b) at the other end thereof, said arm being slidably engaged at the other end thereof with said second loading guide.

15. A magnetic tape recording and/or reproducing apparatus comprising:

a rotary cylinder mounted on a stationary chassis and having a plurality of magnetic transducer heads on a cylindrical surface thereof and rotatable about an axis tilted to the vertical;

a movable chassis for carrying a cassette;

means for moving said movable chassis toward said rotary cylinder;

tape loading means movable with said movable chassis and including first and second posts for pulling a tape out of said cassette and forming an arc on a circumference of said rotary cylinder;

first and second locking means for locking said first and second posts in positions adjacent said rotary cylinder such that said first and second posts are parallel with a center of rotation of said cylinder when said tape is looped on the circumference of said rotary cylinder;

a third, stationary post (5c) for making contact with said tape during recording and playback modes of the apparatus and inclined to the vertical so that the tape is twisted by contact therewith;

a stationary member (64) located on said stationary chassis and having a contact surface parallel with the plane of said tape twisted by said third post;

guide means forming a guide groove on said stationary chassis; and a tape guide arm (25) pivotally mounted at one end thereof on said movable chassis and carrying at the other end thereof a tape guide roller (6f) for contacting said tape in a position adjacent said third post (5c), said tape guide arm having a cylindrical contact surface concentric with a pivot of said tape guide roller (6f) and a cam pin engaged with said guide groove to cause the cylindrical contact surface of said tape guide arm to contact with the contact surface of said stationary member (64) under pressure exerted by said moving means.

16. A magnetic tape recording and/or reproducing apparatus comprising:

a rotary cylinder having a plurality of magnetic transducer heads on a cylindrical surface thereof and rotating on a stationary cylinder about an axis tilted to the vertical;

first and second tape loading means respectively including first and second posts for pulling a tape out of a cassette and forming an arc of tape on a circumference of said rotary cylinder;

a movable chassis for carrying said cassette;

drive means for moving said movable chassis;

locking means for locking said first and second posts in terminal positions in response to the formation of said arc, said locking means comprising a stationary pin fixedly mounted in a position adjacent said stationary cylinder and means for positioning each of said first and second posts against said stationary pin and said stationary cylinder such that axes of said first and second posts are parallel with the axis of rotation of said rotary cylinder;

a cylindrical reel support rotatably mounted on said movable chassis for engaging with a reel of said cassette for unitary rotation therewith;

a rotatable tension arm (22) having a tension post mounted at one end thereof for making pressure contact with said tape being transported during recording and playback modes of said apparatus; and band means (23) connected to the other end of said tension arm and slip-frictionally looped around the circumference of said reel support for counterbalancing a force exerted on said tension arm by pressure contact between said tension post and said tape.

17. A magnetic tape recording and/or reproducing apparatus comprising:

a rotary cylinder mounted on a stationary chassis and having a plurality of magnetic transducer heads on a cylindrical surface thereof and rotatable about an axis tilted to the vertical;

first and second loading guides on said stationary chassis;

a movable chassis on which said cassette is placed; drive means for moving said movable chassis toward said rotary cylinder;

a first tape loading means comprising:

a toothed stationary member (36) secured to said stationary chassis;

a first toothed wheel (37,37a) movable with said movable chassis and rotatable about a first pivot (38) by engagement with said toothed stationary member (36);

a second toothed wheel (43) movable with said movable chassis and rotatable about a second pivot (44) by engagement with said first toothed wheel (37a);

a first loading arm (35) rotatable at one end thereof by rotation of said second toothed wheel (43) and mounting a first post at the other end thereof, the other end of said first loading arm (35) engaging said first loading guide (34) and movable with said movable chassis so that said first post pulls a tape out of said cassette and forms an arc on the cylindrical surface of said rotary cylinder;

a second loading arm (42) rotatable at one end thereof about said first pivot (38) and mounting at the other end thereof said second pivot (44); and guide means (62) for engaging with said second pivot (44) to prevent rotation of said second loading arm (42) about said first pivot (38) when said movable chassis is moving over a predetermined length and disengaging from contact with said second pivot (44) at the end of said predetermined length to allow said second loading arm (42) to rotate about said first pivot (38);

a second tape loading means comprising:

a loading ring coaxially rotatable by said drive means about a center of rotation of said rotary cylinder; and an arm pivoted at one end thereof on said loading ring and mounting a second post at the other end thereof, said arm being slidably engaged at the other end thereof with said second loading guide;

first and second locking means for locking said first and second posts in positions adjacent said rotary cylinder such that said first and second posts are parallel with the center of rotation of said cylinder when said tape is looped on a circumference of said rotary cylinder;

a third, stationary post (5c) positioned to make contact with said tape and inclined to the vertical so that the tape is twisted by contact therewith;

a stationary member (64) located on said stationary chassis and having a contact surface parallel with a plane of said tape twisted by said third post;

guide means forming a guide groove on said stationary chassis; and a tape guide arm (25) pivotally mounted at one end thereof on said movable chassis and carrying at the other end thereof a tape guide roller (6f) for contacting said tape in a position adjacent said third post, said tape guide arm having a cylindrical contact surface concentric with a pivot of said tape guide roller (6f) and a cam pin engaged with said guide groove to cause the cylindrical contact surface of said tape guide arm to contact with the contact surface of said stationary member (64) under pressure exerted by said moving means.

18. A magnetic tape recording and/or reproducing apparatus comprising:

a rotary cylinder having a plurality of magnetic transducer heads on a cylindrical surface thereof and rotating about an axis tilted to the vertical;

a first tape loading means including a first post movable from a first initial position in which said first post is engageable with a tape from a tape cassette to a first terminal position adjacent said rotary cylinder;

a second tape loading means including a second post movable from a second initial position in which said second post is engageable with said tape to a second terminal position adjacent said rotary cylinder;

drive means for driving said first and second tape loading means so that said first and second posts are moved from said first and second initial positions to said first and second terminal positions to cause said tape to be pulled out of said cassette and form an arc of a predetermined angle more than 270° on the cylindrical surface of said rotary cylinder; and locking means for locking said first and second posts in said first and second terminal positions in response to the formation of said arc such that axes of said first and second posts are parallel with the axis of rotation of said rotary cylinder.

19. A magnetic tape recording and/or reproducing apparatus comprising:

a stationary chassis having first and second loading guides (33,34) and a toothed edge (36);

a rotary cylinder mounted on said stationary chassis and having a plurality of magnetic transducer heads on a cylindrical surface thereof and rotatable about an axis tilted to the vertical;

a movable chassis on which a cassette is placed;

drive means for moving said movable chassis toward said rotary cylinder;

a first tape loading means comprising:

a first toothed wheel (37,37a) movable with said movable chassis and rotatable about a first pivot (38) by engagement with said toothed edge (36);

a second toothed wheel (43) movable with said movable chassis and rotatable about a second pivot (44) by engagement with said first toothed wheel (37a);

a first loading arm (35) rotatable at one end thereof by rotation of said second toothed wheel (43) and mounting a first post (5a) at the other end thereof, the other end of said first loading arm (35) engaging with said first loading guide (34), said first loading arm (35) being movable with said movable chassis so that said first post (5a) pulls a tape out of said cassette and forms a first half of arc on the cylindrical surface of said rotary cylinder;

a second loading arm (42) rotatable at one end thereof about said first pivot (38) and mounting at the other end thereof said second pivot (44); and guide means (62) for engaging with said second pivot (44) to prevent rotation of said second loading arm (42) about said first pivot (38) when said movable chassis is moving over a predetermined length of travel toward said rotary cylinder;

a second tape loading means including a second post for pulling said tape out of said cassette along said second loading guide and forming a second half arc on the cylindrical surface of said rotary cylinder; and first and second locking means for locking said first and second posts in positions adjacent said rotary cylinder such that said first and second posts are parallel with the center of rotation of said cylinder when said first and second halves of arc are formed on the circumference of said rotary cylinder, wherein a total angle of said first and second halves of arc is more than 270°.

* * * * *